(12) United States Patent
Ahmad

(10) Patent No.: US 7,330,514 B1
(45) Date of Patent: Feb. 12, 2008

(54) METHODS AND APPARATUS TO MITIGATE CROSS-TALK INTERFERENCE

(75) Inventor: Bilal Ahmad, Islamabad (PK)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 10/812,445

(22) Filed: Mar. 30, 2004

(51) Int. Cl.
*H04B 15/00* (2006.01)
*H04B 3/30* (2006.01)
*H04L 25/03* (2006.01)
*H04L 25/08* (2006.01)

(52) U.S. Cl. .............. 375/285; 375/296; 375/364; 375/257

(58) Field of Classification Search ............ None
See application file for complete search history.

(56) References Cited

U.S. PATENT DOCUMENTS

| | | | | |
|---|---|---|---|---|
| 5,978,417 A | | 11/1999 | Baker et al. ............. 375/232 |
| 6,130,575 A | | 10/2000 | Nelson et al. ............ 327/540 |
| 6,226,331 B1 * | | 5/2001 | Gambuzza ............... 375/258 |
| 6,400,616 B1 | | 6/2002 | Tamura et al. ........... 365/198 |
| 6,534,716 B1 | | 3/2003 | Linnell ................... 174/113 R |
| 6,826,390 B1 | | 11/2004 | Tamura ................... 455/226.1 |
| 7,154,902 B1 * | | 12/2006 | Sikdar ..................... 370/412 |
| 2002/0178319 A1 * | | 11/2002 | Sanchez-Olea ........... 710/305 |
| 2004/0128595 A1 * | | 7/2004 | Schoenborn et al. ...... 714/724 |

OTHER PUBLICATIONS

Stephan, "MultipointLVDS line drivers support AdvancedTCA Clock distrbution," eeProduct Center, Oct. 4, 2004, pp. 1-4.*

* cited by examiner

*Primary Examiner*—Tesfaldet Bocure
(74) *Attorney, Agent, or Firm*—BainwoodHuang

(57) ABSTRACT

A circuit board includes a pair of interconnects configured to support conveyance of a differential mode communication signal, which comprises a balanced first signal (e.g., signal X) and corresponding second signal (e.g., signal −X) of opposite polarities. A transmitter circuit coupled to the pair of interconnects supports generation of a non-differential mode communication signal that is different than a classic differential mode communication signal. A receiver circuit coupled to the first pair of interconnects supports reception of the non-differential mode communication signal. Thus, the pair of interconnects convey the non-differential mode communication signal instead of the differential mode communication signal, mitigating interference with other pairs of interconnects on the circuit board that convey yet other communication signals.

30 Claims, 10 Drawing Sheets

CONVENTIONAL TECHNIQUE

METHODS AND APPARATUS TO MITIGATE CROSS-TALK INTERFERENCE

BACKGROUND OF THE INVENTION

Electronic circuits typically employ hard-wired communication links to convey information within circuit boards as well as between and among local and remote circuit boards. One such type of communication link (e.g., a pair of traces such as interconnects 116-1 and 116-2) is shown in communication system 100 (e.g., a differential mode transmitter-receiver communication system) as illustrated in FIG. 1. As shown, communication system 100 includes differential mode transmitter 110-1 and differential mode transmitter 110-2 (collectively transmitters 110) that transmit corresponding electronic signals $X_1=X$, $X_2=-X$, $X_5=Y$, and $X_6=-Y$ on respective interconnects 116-1, 116-2, 115-1, and 115-2 to differential mode receivers 120-1 and 120-2. Electronic signals $X_1$, $X_2$, $X_5$, and $X_6$ are generated by differential mode transmitters 110 based on digital input signals 105-1 and 105-2. Differential mode receivers 120-1 and 120-2 generate respective digital output signals 125-1 and 125-2 based on electronic signals $X_3$, $X_4$, $X_7$ and $X_8$ received at corresponding inputs.

During differential mode operation, differential mode transmitters 110 generate balanced output signals of opposite polarity. For example, when input signal 105-1 is a logic low, differential mode transmitter 110-1 produces a 0.5 volt output at node 1 of differential mode transmitter 110-1 and a 1.5 volt output at node 2 of differential mode transmitter 110-1. Conversely, when input signal 105-1 is a logic high, differential mode transmitter 110-1 produces a 1.5 volt output at node 1 and a 0.5 volt output at node 2. Signals X and −X are thus conveyed over respective traces 116-1 and 116-2 to differential mode receiver 120-1 that converts the received signals at corresponding input nodes 3 and 4 into output signal 125-1. When differential mode receiver 120-1 detects a difference signal greater than the negative noise margin, i.e., $-(X_3-X_4)>NM_N$, where $NM_N$ is a positive number, e.g., 0.1 V, receiver 120-1 produces a logic low at output signal 120-1. Conversely, when differential mode receiver 120-1 detects a difference signal greater than the positive noise margin, i.e., $X_3-X_4>NM_P$, where $NM_P$ is a positive number, e.g., 0.09V, differential mode receiver 120-1 produces a logic high at output signal 120-1. In a similar way, transmitter 110-2 simultaneously transmits signals Y and −Y to convey information over interconnects 115-1 and 115-2 to receiver 120-2.

High frequency signals sent across interconnects 115 and 116 are modified by the conducting paths. Among other reasons, this may due to dielectric losses in the insulating material surrounding the conductive paths, due to skin effect losses in the conductors themselves, due to impedance variations along the conductive paths. In the absence of coupling between paths 115 and 116, the signals received at nodes 3 and 4 can be described as $^1X_3=H_{31}X_1+H_{32}X_2$, and $X_4=H_{41}X_1+H_{42}X_2$, respectively, where $H_{31}$ and $H_{32}$ are the transfer functions that capture the effect of the path 116 with respect to receiving node 3, and $H_{41}$ and $H_{42}$ capture the effect of path 116 with respect to receiving node 4. This representation implies a frequency domain representation of node signals, and transfer functions.

Conveying balanced and oppositely polarized signals (i.e., differential mode communication signals) such as X and −X in this way generally enables higher speed communication because of reduced susceptibility to noise (e.g., cross-talk). However, when pushing the limits on a particular link (e.g., a pair of traces such as interconnects 116-1 and 116-2) such as transmitting in the Gigahertz range, the signals $X_3$, $X_4$, $X_7$, and $X_8$ may become corrupt due to effects such as intersymbolinterference (ISI) and cross-talk. For example, because interconnect 116-1 is parallel and in close proximity to interconnect 115-1, a certain amount of cross-talk Yc couples from signal $X_5$ onto interconnect 116-1; the voltage at node 3 of receiver 120-1 is $X_3=H_{31}X_1+H_{32}X_2+Yc$. Based on coupling of cross-talk −Yc caused by signal −Y onto interconnect 116-2, the voltage at node 4 of differential mode receiver 120-1 is $X_4=H_{41}X_1+H_{42}X_2-Yc$. The effects of cross-talk Yc and −Yc may be so great as to limit the rate at which differential mode transmitter 110-1 effectively transmits data to differential mode receiver 120-1. In a similar way, the effects of cross-talk from signal $X_1$, $X_2$ onto respective interconnects 115-1 and 115-2 may be so great as to limit the rate at which differential mode transmitter 110-1 effectively transmits data to differential mode receiver 120-2.

The above example illustrates a straight-forward technique of supporting differential communications via use of analog circuitry and the ill-effects of cross-talk. Conventional methods such as those based on DSP (Digital Signal Processing) may employ techniques to mitigate the effect of cross-talk. In general, DSP involves converting an analog signal to a corresponding digital signal which, in turn, is processed by a high speed processor device to recover an original signal encoded with information.

One method of addressing cross-talk is to learn the behavior of an interfering channel (e.g., a particular link) by sending known symbols from the aggressor transmitter and analyzing the response at the victim receiver. Once this behavior is learned, the interference signal under normal operation can be estimated and therefore canceled. Thus, in general, this method involves attempting to actively cancel cross-talk based on the learned information.

Often linear equalizers are used to correct for frequency dependent loss—which causes inter-symbol-interference (ISI)—in the channel. Unfortunately, this technique also enhances interference at high frequencies. Another method uses Decision Feedback Equalization (DFE); here a scaled form of the previous decisions is used to correct for Inter-Symbol-Interference in the current symbol. In this way, DFE does not enhance cross-talk while it corrects for ISI. In general, this method is effective in discerning the desired signal without necessarily exacerbating the effect of interference.

Yet another method of signal estimation in the presence of cross-talk, in contrast to determining each symbol individually in time, is to employ Maximum Likelihood Sequence Estimation (MLSE) that involves picking the most likely sequence of symbols to make a decision.

SUMMARY

Conventional techniques of reducing the ill-effects of cross-talk suffer from certain deficiencies. One such deficiency is that conventional DSP techniques cited above are quite costly and complex to implement for systems supporting communication in the Gigabit/second range. For example, DSP solutions require costly high-speed A/D (Analog to Digital) converters as well as costly high-speed data processing devices that consume substantial power. A pre-existing electronic system may not easily lend itself to use of a higher speed processor (or even one at all if the system does not originally include use of a DSP device) because the system may not be able to provide enough power to operate the high speed processor (e.g., DSP device). Consequently, an attempt to mitigate cross-talk via use of DSP techniques may involve not only providing a complex, high-speed DSP solution but also may require redesigning an entire electronic system as a result of the need for increased power, increased cooling capacity, increased circuit board space for new components, etc.

One conventional solution to alleviate cross-talk (and therefore increase bandwidth) among pairs of interconnects (e.g., traces, conductive paths, etc.) in a circuit board is to re-layout the circuit board with the intent of more effectively isolating the pairs of interconnects from each other to reduce cross-talk. However, this solution has several drawbacks. First, it is quite often costly and time-consuming to re-layout a circuit board. Second, even if a circuit board is modified, re-layout of the circuit board may not effectively reduce cross-talk among communications signals. Third, the circuit board may be a backplane embedded in an expensive hardware system that has already been shipped to a customer site. Thus, replacement of the backplane in such circumstances is typically undesirable because the backplane usually is disposed at a core of the electronic system and typically requires considerable amount of time to replace. A customer may not tolerate an amount of down-time of the electronic system as a result of having to replace the backplane.

Although many customers may not be able to tolerate system downtime or a high cost of replacing a backplane in the system, the same customers may be interested in being able to increase communication rates supported by the backplane to enhance overall performance of their systems. Thus, there exists a need to provide increased bandwidth without the inconvenience and expense of completely overhauling an entire electronic system including transmitter circuit, receiver circuit and corresponding circuit boards (e.g., backplane) through which the pairs of interconnects pass in order to enhance a system's performance.

Note that embodiments of the invention are not limited to solving backplane problems. For example, certain cables and connectors as well as other electronic circuits in general may benefit from incorporation of embodiments of the invention.

In contrast to the above-described conventional approaches to alleviating the effects of cross-talk, embodiments of the invention are directed towards utilizing pre-existing interconnects (e.g., circuit board traces of an existing backplane) to convey a non-differential mode electronic signal in lieu of conveying an originally intended differential mode communication signal on each pair of conductive paths. Further embodiments of the invention are directed towards providing a minimally invasive technique of modifying one or multiple communication signals transmitted over corresponding pre-existing interconnects in a backplane such that cross-talk is minimized and the rate of communicating can be increased without requiring any time-consuming or costly system overhauls. For example, instead of modifying a layout of pre-existing circuit traces in a backplane circuit board such as interconnects shown in FIG. 1 to reduce cross-talk, transmitter and/or receiver circuits in corresponding line cards coupled to the interconnects may be modified so that signals conveyed on the interconnects of the backplane are no longer classic differential mode communication signals (e.g., balanced and oppositely polarized voltage signals). New line cards (including circuitry to support transmission and reception of non-differential mode communications) are typically simple to install in place of old line cards that previously supported only classic differential mode communications. In such an instance, a backplane circuit need not be redesigned and replaced to upgrade a system. Instead, a system may be upgraded by merely replacing the new line cards (supporting non-differential mode communications) in place of the old line cards (supporting classic differential mode communications). In certain cases, filters are deployed in relation to the transmitter and receiver circuits to support non-differential mode communication signals. Non-differential mode communication signals include pairs of signals that are different in magnitude with respect to each other, pairs of signals that are no longer opposite in polarity with respect to each other, and other variations as well. In certain cases, the electronic circuits (e.g., transmitters and receivers) may be configured to support single-ended mode and common mode communication signals instead of differential mode communications. As discussed, supporting transmission and reception of non-differential mode communication signals in lieu of differential mode communications may reduce cross-talk, thus enabling higher communication rates. For example, based on proper implementation of filters at the transmitter and or receiver, a corresponding link initially supporting only a 2 Gb/s data rate when using a differential mode may otherwise support a 4 Gb/s or higher rate when conveying non-differential communication signals.

Note that embodiments of the invention are directed to differential mode applications as well as non-differential mode applications. One may refer to a combination of these modes as a "generalized-mode". The best mode of operation for a given set of interconnects may be single-ended, common-mode, something in between, or even differential. Thus, for purposes of the following discussion, it is to be understood that embodiments of the invention apply to both non-differential mode as well as differential mode applications (e.g., generalized mode) even though an illustrative embodiment is described as being directed toward use in a non-differential mode application.

In view of the specific embodiment discussed above, a general embodiment of the invention involves a technique of mitigating cross-talk based on use of a pair of interconnects that are configured to support conveyance of a differential mode communication signal, which comprises a balanced first signal (e.g., signal X) and corresponding second signal (e.g., signal −X) of opposite polarities as in the example discussed above for FIG. 1. A transmitter circuit coupled to the pair of interconnects supports generation of a second mode communication signal (e.g., a non-differential mode communication signal) that is different than a classic differential mode communication signal. For example, the interconnects support conveyance of differently shaped or distorted signals other than differential mode signals X and −X, which are balanced (e.g., in the above example, each has the same magnitude) and opposite in polarity with respect to each other. A receiver circuit coupled to the first pair of interconnects supports reception of the non-differential mode communication signal (e.g., any communication mode supporting a format other than signal $X_3$−$X_4$.). Thus, the pair of interconnects (e.g., circuit board traces) convey the non-differential mode communication signal instead of the differential mode communication signal to mitigate interference with other pairs of interconnects on the circuit board that convey yet other communication signals.

In one application, the pair of interconnects are disposed on a pre-existing circuit board such as a backplane in an electronic system. Both a transmitter circuit board including the transmitter circuit and a receiver circuit board including the receiver circuit are pluggable into the backplane. During operation and when the transmitter and receiver circuit boards are plugged into the backplane, the transmitter circuit supports transmission of the non-differential (or second) mode communication signal to the receiver circuit over the first pair of interconnects of the backplane to support mitigation of cross-talk. Accordingly, techniques of the present invention are well suited for modifying aspects of pluggable circuit boards (e.g., line cards) including corresponding transmitter and receiver circuits instead of replacing or modifying a corresponding backplane and corresponding pre-existing pairs of interconnects over which the pluggable circuit boards respectively transmit and receive communication signals. Upgrading line cards and, in particular, corresponding transmitter and or receiver circuit boards to include filters, is minimally invasive compared to overhauling a backplane or otherwise providing complex DSP circuitry. Thus, higher speed communication may be afforded to a customer merely by replacing old line cards with new line cards, in which the new line cards include circuitry (e.g., filters or different integrated circuit chips) supporting transmission and reception of non-differential mode communication signals through interconnects of the pre-existing backplane.

In one embodiment, the transmitter circuit includes one or more filter circuits in communication with corresponding interconnects to support transmission of the non-differential communication signal. Similarly, the receiver circuit includes one or more other filter circuits in communication with at least one of the interconnects of the backplane to support transmission of the non-differential communication signal. During operation, the filters support the conveyance of the non-differential mode communication signals between the transmitter and receiver, in which the non-differential mode communication signals is a pair of unbalanced communication signals including a first signal and a second signal having substantially different voltage magnitudes (e.g., amplitudes) relative to each other. The second mode communication signals support conveying information on the pair of interconnects at a higher rate than the originally intended differential mode communication signals.

In one embodiment, both the transmitter circuit and receiver circuit each include filters comprising discrete electronic components (e.g., resistors and capacitors). As mentioned, use of the filters at least partially causes the differential mode communication signals transmitted by the transmitter circuit to be conveyed as non-differential mode communication signals (such as single-ended mode communication signals, common mode communication signals, and variations in between) on the interconnects of the backplane.

In still another embodiment, the transmitter circuit and the receiver circuit each include respective software programmable transmitter and receiver devices that are selectively configurable to support one of: i) differential mode communications, ii) common-mode communications, and iii) single-ended mode communications.

As discussed, embodiments of the invention may be employed to mitigate the effects of cross-talk in a communication system, thus, enabling such a system to support higher communication rates. As discussed, the techniques herein are particularly well-suited for upgrading pre-existing electronic systems and, specifically, electronic circuit boards such as backplanes (e.g., circuit boards providing connectivity between daughter boards or line cards) that are not easily replaced and that require increased communication bandwidth. Instead of backplane replacement, line cards including transmitter and receiver circuits may be modified such that corresponding pairs of interconnects on the backplane support higher throughput even though such traces were originally designed to support transmission of classic differential mode communication signals (e.g., balanced pairs of signals of opposite polarity).

Other embodiments of the invention include execution of a software program on a computer system, or other device, configured with the software program and/or circuitry to process and perform all (or a portion thereof) of the method operations noted above and disclosed herein as embodiments of the invention. In such embodiments, the computer device, such as a personal computer, includes a memory unit (e.g., any type of computer readable medium, storage or memory system), a processor, and an interconnect mechanism connecting the processor and the memory. In such embodiments, the memory system is encoded with an application or software program that causes the computer system to perform any part and/or all of the method embodiments, steps and operations explained herein as embodiments of the invention. In other words, a computer that is programmed or otherwise configured to operate as explained herein is considered an embodiment of the invention.

Accordingly, in further embodiments and yet other independent embodiments of the invention, a computer system supports mitigating interference among communication signals by executing an application to determine which of multiple combinations of filters is preferably applied to the transmitter and receiver circuits to increase overall bandwidth of conveying information on pre-existing pairs of interconnects that were originally designed to convey differential mode communication signals. As discussed, use of the filters in the corresponding transmitter/receiver circuits changes the shape of communications conveyed on the conductive paths.

A computer executes the program to perform operations of first receiving coupling characteristics associated with interconnects that convey the communication signals. The coupling characteristics may be determined based on electronic measurements to interconnects on a backplane indicating a degree to which the communication signals couple from one set of interconnects to another set of interconnect in a pre-existing circuit board such as a backplane. Additionally, coupling characteristics may be determined by estimating coupling characteristics associated with the interconnects based on an analysis of a physical layout of interconnects on a circuit board conveying the communication signals to quantify a degree to which communication signals theoretically couple amongst one another.

The computer then performs a simulation, calculating an effect of applying different combinations of filters at the transmitter and receiver at either ends of corresponding pairs of conductive paths. Based on simulation results, the computer may then select a preferred combination of filters to be applied to the transmitter and receiver circuits that respectively transmit and receive corresponding communication signals on the interconnects of the backplane. As discussed, use of the filters on one or multiple pairs of interconnects at the transmitter and/or receiver changes characteristics of the signals conveyed on respective conductive paths. For example, use of one more selected filters at the transmitter/receivers changes voltage characteristics of the corresponding communication signal conveyed over the conductive paths, thus reducing interference and enabling higher communication rates.

One embodiment of the present invention is directed to a computer program product that includes a computer readable medium having instructions stored thereon for identifying filters that may be used to enhance a rate of communications. The instructions, when carried out by a processor of the data communication device, cause the processor to perform the operations of: i) receiving coupling characteristics associated with interconnects that convey the communication signals; ii) via simulation, calculating an effect of applying different combinations of filters to the conductive paths; and iii) selecting one of the combinations of filters to mitigate interference of the communication signals on the conductive paths. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such in a content engine coupled to a network. The features of the invention, as explained herein, may be employed in data communications devices, computerized devices and/or software systems for such devices such as those manufactured by Cisco Systems, Inc. of San Jose, Calif.

Figure 1:
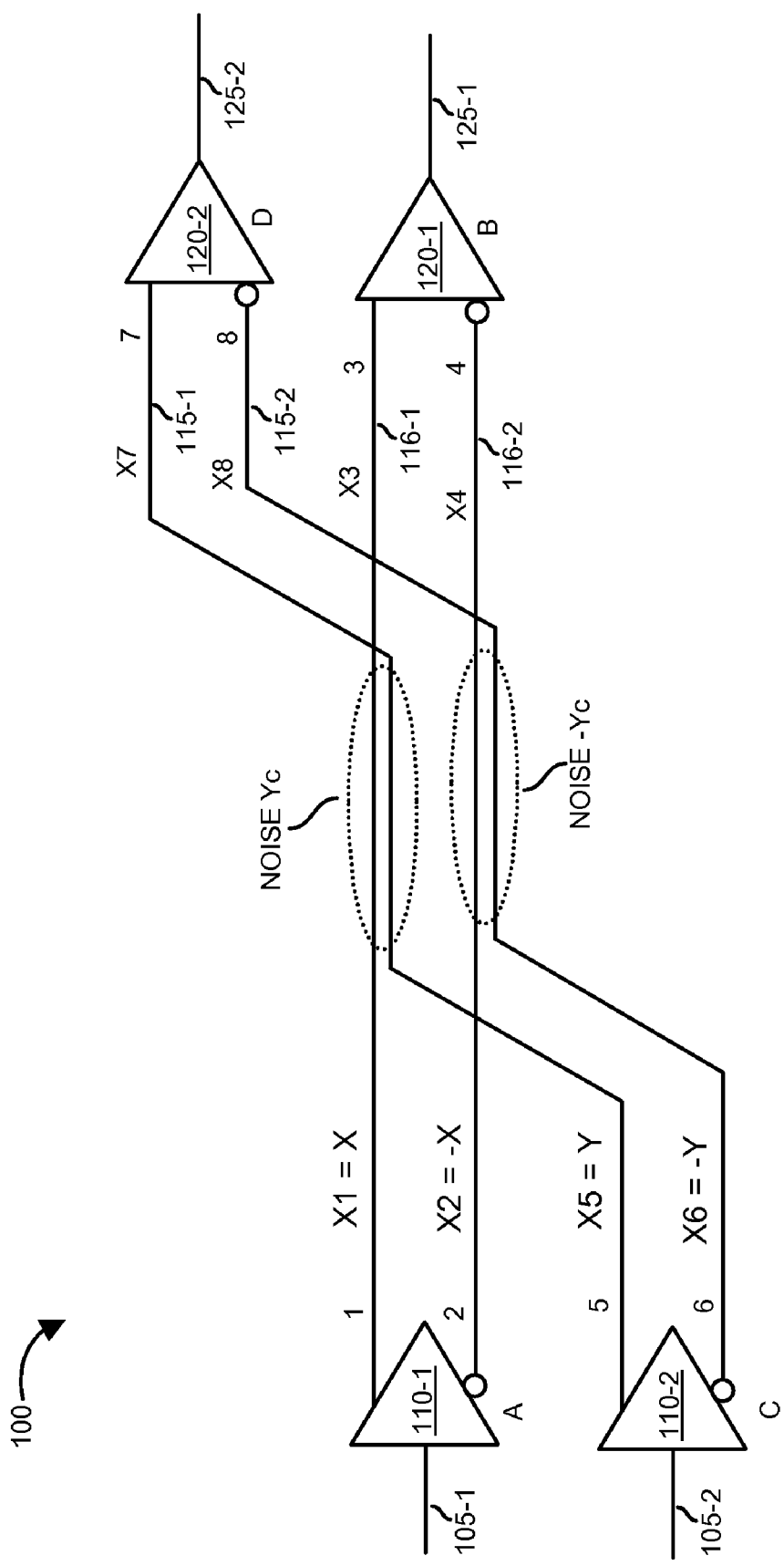
FIG. 1 is a circuit diagram of a communication system supporting transmission of differential mode communications according to conventional techniques.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

An embodiment of the invention is directed towards providing a relatively non-invasive technique of mitigating cross-talk by supporting conveyance of non-differential communication signals (instead of differential mode communication signals) over corresponding pre-existing interconnects in a backplane to reduce cross-talk and thus support higher communication data rates. For example, instead of modifying a layout of pre-existing interconnects in a circuit board such as those shown in FIG. 1 to reduce cross-talk, transmitter and/or receiver circuits (e.g., at either ends of a pair of corresponding conductive paths) may be configured so that corresponding communication signals conveyed on the interconnects are no longer classic differential mode communication signals (e.g., balanced and oppositely polarized voltage signals). Instead, the corresponding communication signals conveyed on the interconnects are non-differential mode communication signals (e.g., unbalanced and/or non-oppositely polarized voltage signals) supported by a corresponding transmitter and receiver at respective ends of the pair of conductive paths.

Non-differential mode communication signals include pairs of signals that are different in magnitude with respect to each other, pairs of signals that are no longer opposite in polarity with respect to each other, and other variations as well. In extreme cases, the electronic circuits (e.g., transmitters and receivers) support single-ended mode and common mode communication signals instead of a differential mode communications. Thus, certain embodiments of the invention are directed towards utilizing pre-existing interconnects (e.g., circuit board traces of an existing backplane) to convey a common mode or single-ended mode communication signals in lieu of conveying an originally intended differential mode communication signals. Of course, these are extreme cases and conveyance of non-differential mode communications encompasses other variations in between. As discussed, supporting transmission and reception of non-differential mode communication signals in lieu of differential mode communications may reduce cross-talk thus enabling higher communication rates.

Note that embodiments of the invention are directed to differential mode applications as well as non-differential mode applications. One may refer to a combination of these modes as a "generalized-mode". The best mode of operation for a given set of interconnects may be single-ended, common-mode, something in between, or even differential. Thus, for purposes of the following discussion, it is to be understood that embodiments of the invention apply to both non-differential mode as well as differential mode applications (e.g., generalized mode) even though an illustrative embodiment is described as being directed toward use in a non-differential mode application.

Figure 2:
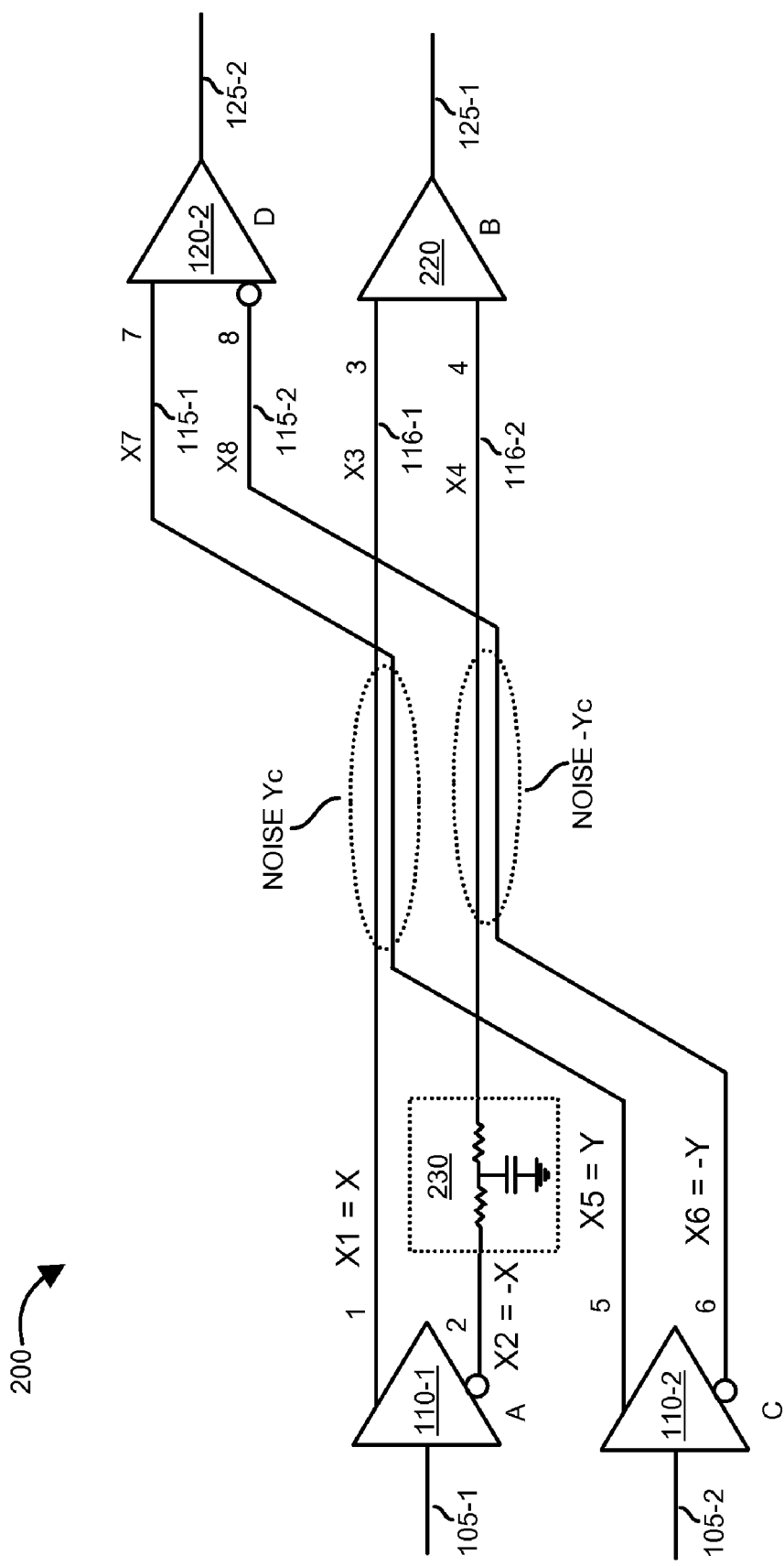
FIG. 2 is a circuit diagram illustrating replacement of a differential receiver with a common mode receiver and implementation of a filter to support non-differential mode communications according to an embodiment of the invention.

FIG. 2 is a circuit diagram (similar in some respects to that shown in FIG. 1) illustrating replacement of a differential mode receiver 120-1 with a common mode receiver 220 and inclusion of a filter 230 enabling non-differential mode communications according to an embodiment of the invention. The embodiment shown includes two transmitters and two receivers. Of course, the number of transmitters and receivers could me more than two. Also, the number of interconnects could me more than two for each transmitter and receiver. The embodiments shown as well as those in other figures are simplified for illustrative purposes.

As shown, communication system 200 includes differential mode transmitter 110-1, differential mode transmitter 110-2, filter 230, differential mode receiver 120-2, common mode receiver 220, and respective interconnects 115-1, 115-2, 116-1, and 116-2 upon which signals $X_1=X$, $X_2=-X$, $X_5=Y$ and $X_6=-Y$ are at least initially transmitted by differential mode transmitters 110-1 and 110-2. More specifically, differential mode transmitter 110-1 and differential mode transmitter 110-2 respectively generate signals $X_1=X$, $X_2=-X$, $X_5=Y$, and $X_6=-Y$ (e.g., electronic signals) based on digital input signals 105-1 and 105-2.

During operation, differential mode transmitter 110-1 transmits (or attempts to transmit) signals $X_1=X$ and $X_2=-X$ on respective interconnects 116-1 and 116-2. However, filter 230 (e.g., an RCR filter made up of discrete resistor and capacitor components) coupled to interconnect 116-2 effectively eliminates any AC (Alternating Current) component transmitted by node 2 of differential mode transmitter 110-1 on to interconnect 116-2 by shunting the AC component to ground. Thus, a combination of differential mode transmitter 110-1 and filter 230 turns into a single-ended mode transmitter device. From differential mode transmitter 110-1, common mode receiver 220 receives signal $X_3=H_{31}X_1+H_{32}X_2=H_{31}X$ at node 3 but $X_4=H_{41}X_1+H_{42}X_2=H_{41}X_1\approx 0$ (because $H_{41}$ is small for loosely coupled 116-1 and 116-2) not signal $-X$ at node 4 because filter 230 shunts that latter signal to ground.

Note that the coupled signal $Y_c$ is the coupled signal from node 5 to node 3. It is important to convey that the quantity $Y_c$ represents the ratio of coupling between 116-1 and 115-1 as observed from node 3 with reference to node 5. At intermediate locations, (e.g., 2" before node 3) but still on interconnect 116-1, the signal will be different from $Y_c$.

Also during operation, differential mode transmitter 110-2 transmits respective signals $X5=Y$ and $X6=-Y$ onto respective interconnects 115-1 and 115-2 to differential mode receiver 120-2. Based on conveyance of signals Y and $-Y$ onto respective interconnects 115-1 and 115-2, noise Yc (measured at node 3) couples onto interconnect 116-1 and noise $-Yc$ (measured at node 4) couples onto interconnect 116-2. This is because in this particular instance the coupling between 115-1 and 116-1 is the same as that between 115-2 and 116-2. Common mode receiver is effectively a summer and thus noise Yc and noise $-Yc$ cancel each other. Thus, overall cross-talk interference is reduced, and the signal to interference ratio (e.g., signal to noise ratio) in this example ideally enhanced to infinity. Also, the amount of signal received at common mode receiver 220 therefore is halved because filter 230 inhibits conveyance of signal $X_2=-X$ on interconnect 116-2. However, even though an overall magnitude of received signal is reduced, the signal to interference ration is increased. The benefit of reducing effective interference in this way enables differential mode transmitter 110-1 to convey information on interconnects 116-1 and 116-2 at a higher communication rate than that supported in communication system 100 in FIG. 1. Note also that the effective noise (i.e., cross-talk) at differential mode receiver 120-2 is effectively cut in half because filter 230 eliminates the disturbance due to signal $X_2=-X$ on 115-2 interconnect as none of signal X2 appears on 116-2 interconnect.

As discussed, inputs 105 and outputs 125 may be digital signals but note that in other embodiments, they are analog signals.

Figure 3:
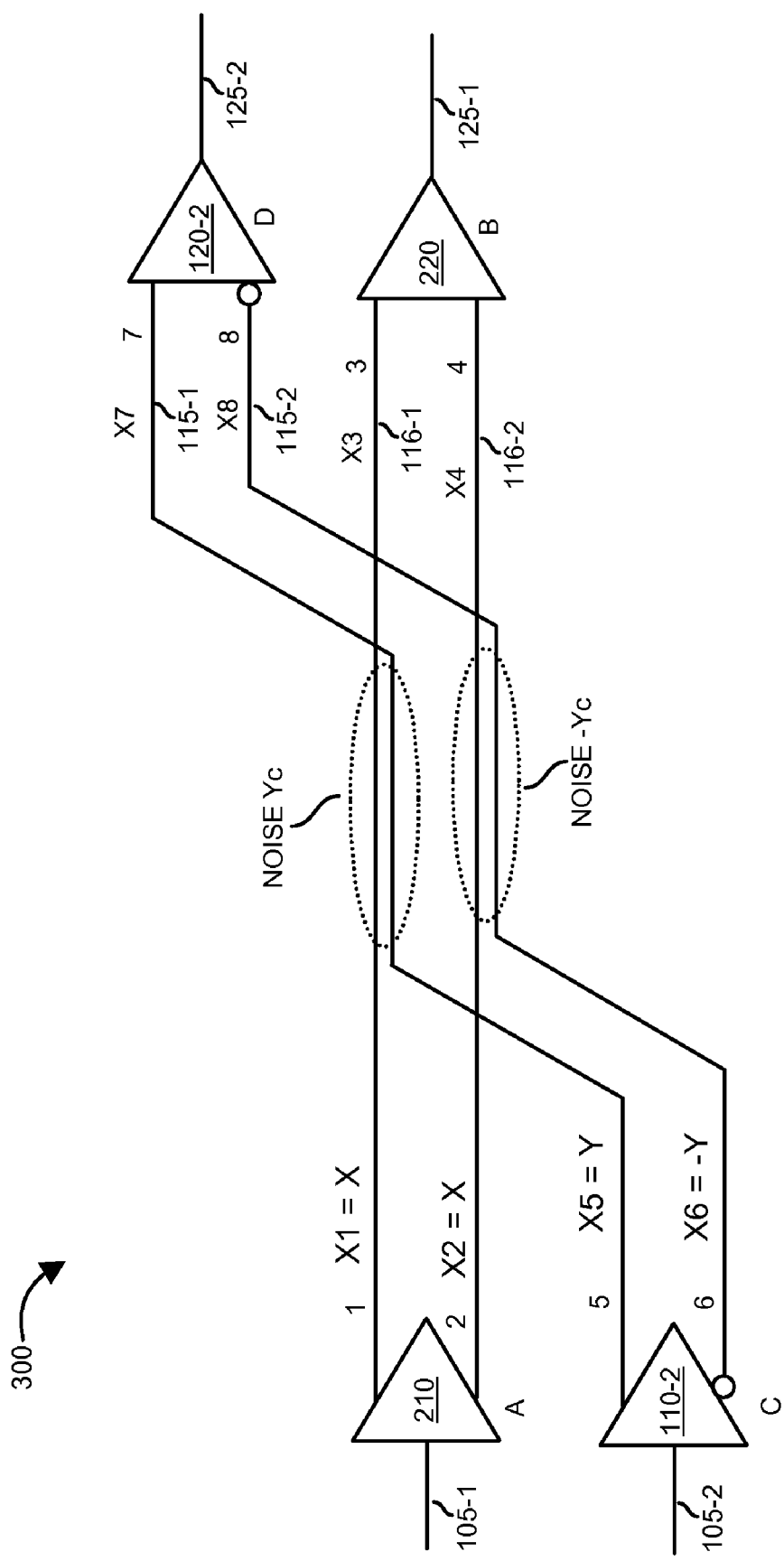
FIG. 3 is a circuit diagram illustrating replacement of a differential mode transmitter/receiver with a common mode transmitter/receiver to support non-differential mode communications according to an embodiment of the invention.

FIG. 3 is a circuit diagram illustrating replacement of an existing differential mode transmitter/receiver pair as in FIG. 1 with a common mode transmitter/receiver pair to support non-differential mode communications according to an embodiment of the invention. As shown, communication system 300 includes common mode transmitter 210, differential mode transmitter 110-2, differential mode receiver 120-2, common mode receiver 220, and respective interconnects 115-1, 115-2, 116-1, and 116-2 upon which signals $X_1=X$, $X_2=X$, $X_5=Y$ and $X_6=-Y$ are transmitted. Signals $X_1=X$, $X_2=X$, $X_3=Y$, and $X_4=-Y$ (e.g., electronic signals) are generated by respective common mode transmitter 210 and differential mode transmitter 110-2 based on digital input signals 105-1 and 105-2. Note that common mode transmitter 210 generates signal $X_2=X$ at node 2 instead of signal $-X$.

During operation, common mode transmitter 210 transmits signal X on both interconnects 116-1 and 116-2. However, in this embodiment, common mode receiver 220 adds signal X3 (from interconnect 116-1) and signal X4 (from interconnect 116-2) on respective node 3 and node 4 of common mode receiver 220 (which provides a summer function) so that the overall received signal is $X_3+X_4=H_{31}X+H_{32}X+H_{41}X+H_{42}X\approx 2H_{31}X$ (for loosely coupled 116-1 and 116-2 $H_{32}$ and $H_{41}$ are small; also, $H_{31}\approx H_{42}$). Thus, a same amount of signal is received as communication system 100 in FIG. 1. However, note that differential mode transmitter 110-2 transmits respective signals $X5=Y$ and $X6=-Y$ from nodes 5 and 6 onto interconnects 115-1 and 115-2 coupling corresponding noise Yc (measured at node 3) onto interconnect 116-1 and noise $-Yc$ (measured at node 4) onto interconnect 116-1. Common mode receiver 220 thus receives noise Yc at node 3 and $-Yc$ at node 4 which effectively cancels out because common mode receiver 220 provides a summer function. The overall effect is an increase of the signal to interference ratio.

Note also that noise (having a same magnitude and polarity) coupling from respective interconnects 116-1 and 116-2 onto interconnects 115-1 and 115-2 cancel each other out because differential mode receiver 120-2 effectively provides a difference function. In summary, the amount of effective interference received at differential mode receiver 120-2 and common mode receiver 220 is ideally reduced to zero. Reducing effective interference in this way (e.g., replacing integrated circuits from one type to another) enables common mode transmitter 210 to convey information on interconnects 116-1 and 116-2 at a higher communication rate than that supported in communication system 100 in FIG. 1. Similarly, differential mode transmitter 110-2 may also support conveying information on interconnects 115-1 and 115-2 at a higher communication rate than that supported in communication system 100 in FIG. 1.

Figure 4:
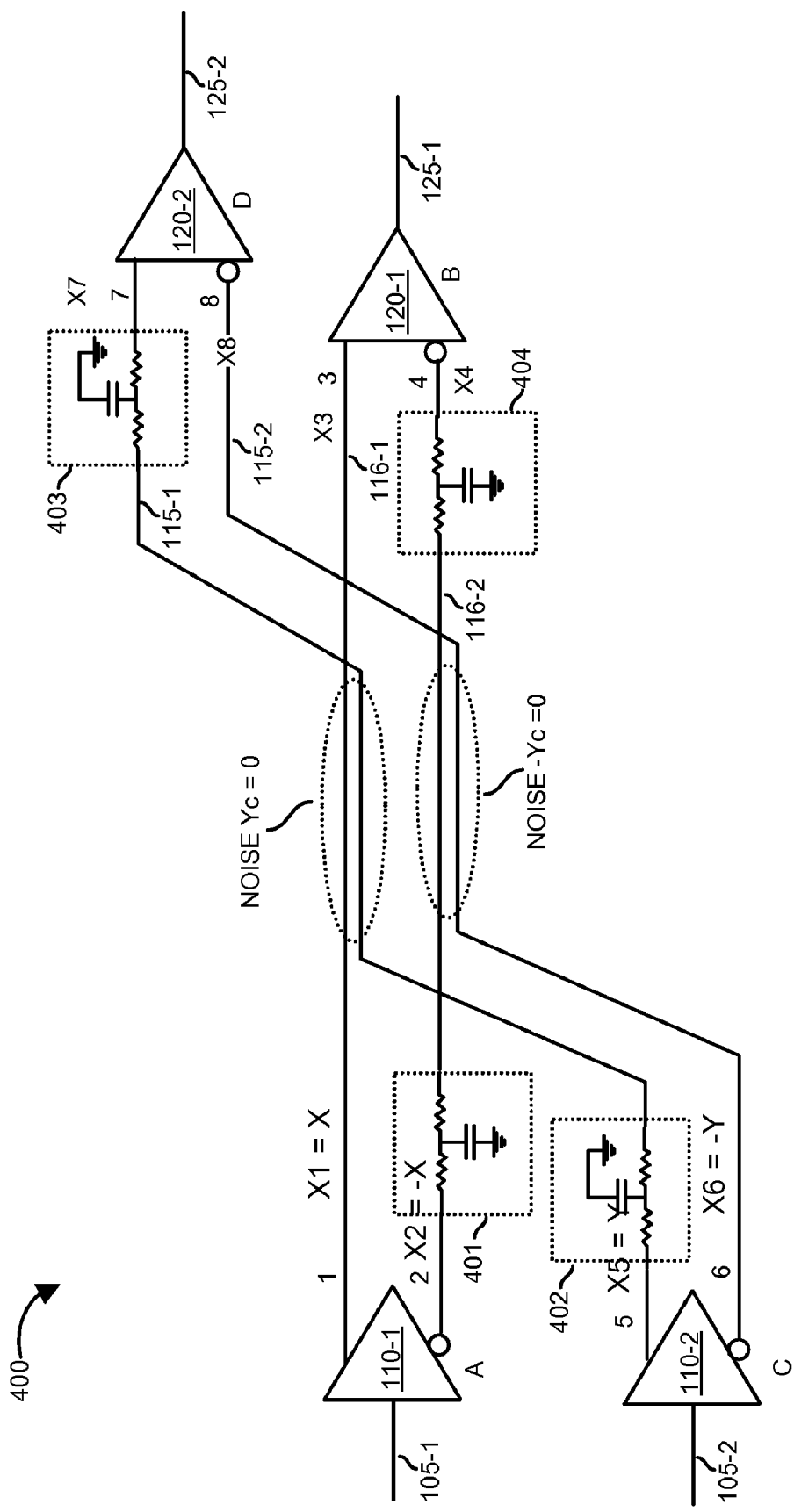
FIG. 4 is a circuit diagram illustrating use of filters in a communication system to support non-differential mode communications according to an embodiment of the invention.

FIG. 4 is a circuit diagram illustrating use of filters in communication system 400 to support non-differential mode communications according to an embodiment of the invention. As shown, communication system 400 includes differential mode transmitter 110-1, differential mode transmitter 110-2, filter 401, filter 402, filter 403, filter 404, differential mode receiver 120-1, differential mode receiver 120-2, and respective interconnects 115-1, 115-2, 116-1, and 116-2 upon which signals $X_1=X$, $X_2=-X$, $X_5=Y$ and $X_6=-Y$ are at least initially transmitted by differential mode transmitters 110-1 and 110-2. More specifically, signals $X_1=X$, $X_2=-X$, $X_5=Y$, and $X_6=-Y$ (e.g., electronic signals) are generated by respective differential mode transmitter 110-1 and differential mode transmitter 110-2 based on digital input signals 105-1 and 105-2.

During operation, differential mode transmitter 110-1 transmits (or attempts to transmit) signals $X_1=X$ and $X_2=-X$ on respective interconnects 116-1 and 116-2. However, filter 401 (e.g., an RCR filter made up of discrete resistor and capacitor components) interconnect effectively eliminates any AC (Alternating Current) component transmitted by node 2 of differential mode transmitter 110-1 on to interconnect 116-2. Filter 404 suppresses any AC component coupled from 115-2 to 116-2 from reaching node 4. Thus, a combination of differential mode transmitter 110-1 and filter 401 turns the transmitter circuit into a single-ended mode transmitter device in which one signal is, e.g., a DC component such as 1.0 volts and the other signal (e.g., signal X on node 1) is a two-level waveform offset by 1.0 volts DC. From differential mode transmitter 110-1, corresponding differential mode receiver 120-1 receives signal $H_{31}X$ at node 3 and a 1.0 volt DC (e.g., only a DC portion and not all of original signal $-X$) at node 4.

Also during operation, differential mode transmitter 110-2 (at least initially attempts to) transmit respective signals $X_5=Y$ and $X_6=-Y$ onto respective interconnects 115-1 and 115-2 to differential mode receiver 120-2. Filter 402 interconnect effectively eliminates the AC component (or high frequency components) in signal Y from node 5 so that 1.0 volt DC is conveyed on interconnect 115-1 to node 7 of differential mode receiver 120-2. Filter 403 prevents AC component coupled from 116-1 to 115-1 from reaching node 7. On the other hand, differential mode receiver 120-2 receives signal $-X8=-H86Y$ from node 6 of differential mode transmitter 110-2 because there are no filters on interconnect 115-2. Based on conveyance of only signal $-Y$ on interconnect 115-2, any noise $-Yc$ coupling onto interconnect 116-2 shunts to ground via filters 401 and 404. No noise couples onto interconnect 116-1 from interconnect 115-1 because signal $X_5=Y$ is shunted to ground via filter 402. Differential mode receiver 120-1 thus receives no noise at either node 3 and node 4. For similar reasons, no noise couples from interconnects 116-1 and 116-2 to respective interconnects 115-1 and 115-2. Thus, placement of filters 401, 402, 403, and 404 on interconnects 115-1 and 116-2 reduces overall noise and enables higher data communication rates even though conveyed signals are no longer differential mode communication signals.

In conclusion, FIGS. 2-4 illustrate embodiments of the invention that involve combinations of modifying an integrated circuit device (e.g., replacing a differential mode transmitter with a common mode transmitter) and/or adding filters via the use of discrete components coupled to corresponding interconnects to reduce interference and thus increase a potential rate for conveying data from a source to a destination.

Figure 5:
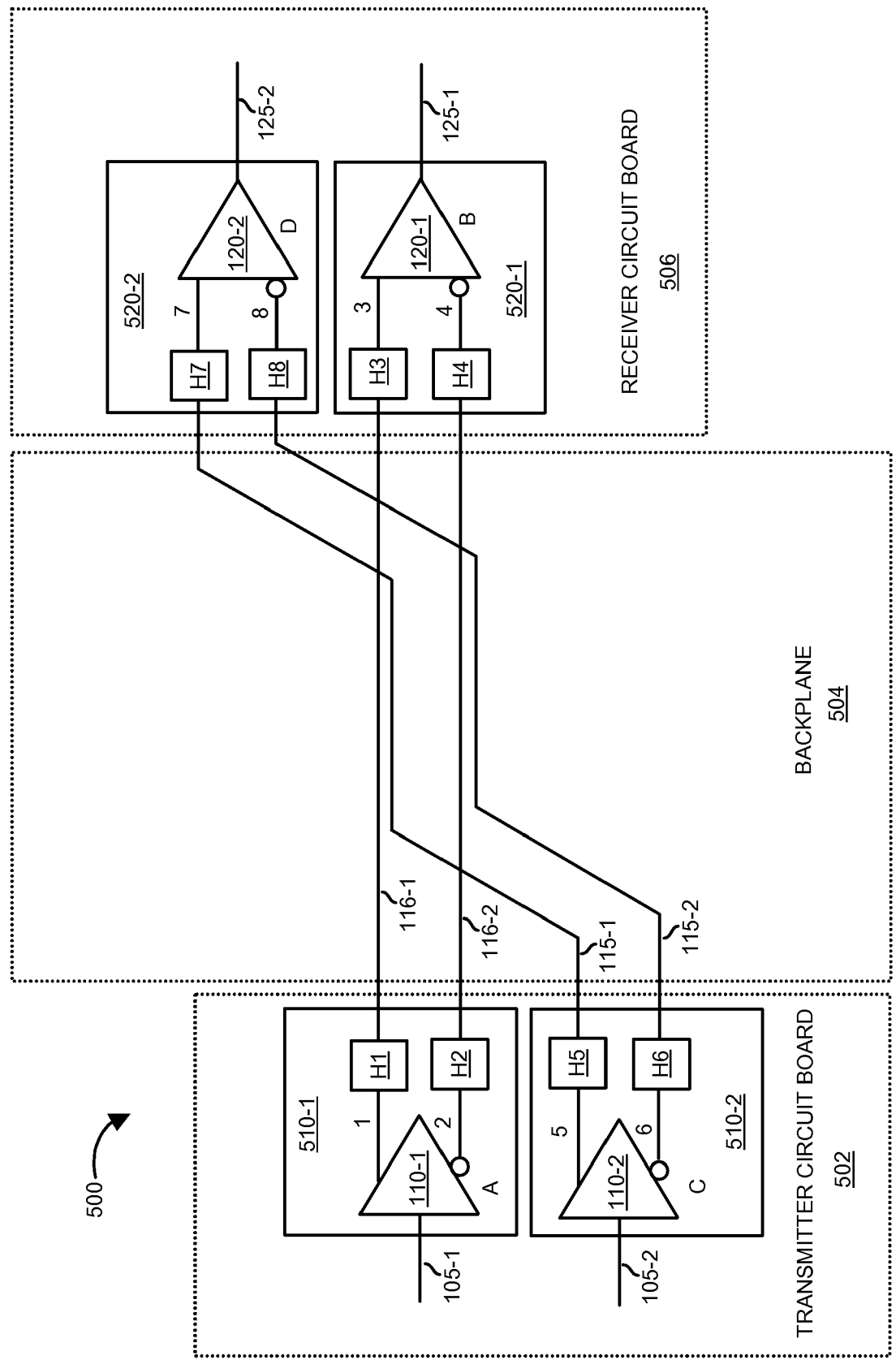
FIG. 5 is a circuit diagram illustrating use of filters in a communication system to support non-differential mode communications according to an embodiment of the invention.

FIG. 5 is a circuit diagram illustrating use of filters in communication system 500 to support different types of communication modes according to an embodiment of the invention. As shown, communication system 500 includes a transmitter circuits 510-1 and 510-2, backplane 504, and receiver circuits 520-1 and 520-2. Transmitter circuits 510-1 and 510-2 may be on a single board 502, or on separate boards 502-1 and 502-2.). Transmitter circuit 510-1 includes differential mode transmitter 110-1 and corresponding filters H1 and H2 coupled to respective nodes 1 and 2. Transmitter circuit 510-2 includes differential mode transmitter 110-2 and corresponding filters H5 and H6 coupled to respective nodes 5 and 6. Backplane 504 includes pairs of interconnects 115 and 116 to convey electronic signals. Receiver circuits 520-1 and 520-2 may be on a single board 506, or on separate boards 506-1 and 506-2. Receiver circuit 520-1 includes differential mode receiver 120-1 and corresponding filters H3 and H4 coupled to respective nodes 3 and 4. Receiver circuit 520-2 includes differential mode receiver 120-2 and corresponding filters H7 and H8 coupled to respective nodes 7 and 8.

According to one embodiment of the invention, filters H1 through H8 may be chosen to support the above examples in FIGS. 2-4. For example, the filters H1 through H8 may be deployed using discrete components such as resistors and capacitors or, alternatively, maybe implemented in corresponding integrated circuits to provide similar functionality. This latter embodiment will be discussed in relation to FIGS. 9 and 10. In one extreme case, a respective filter H provides no filtering function whatsoever. In another extreme case, a respective filter H may be chosen to eliminate all AC components of a signal on a given interconnect as discussed above. Thus, there is wide latitude in choosing filter values depending on a particular interference coupling problem that is being addresses. As mentioned, use of filters $H_1$ through $H_8$ to transmit non-differential mode signals instead of differential mode communication signals enables higher communication data rates in pre-existing interconnects 115 and 116 in backplane 504.

In contrast to the above-described conventional approaches to alleviating the effects of cross-talk, an embodiment of the invention is directed towards providing a minimally invasive technique of modifying one or multiple communication signals transmitted over corresponding pre-existing interconnects 115 and 116 in a backplane 504 such that cross-talk is minimized and the rate of communicating can be increased without requiring any time-consuming or costly system overhauls. For example, instead of modifying a layout of pre-existing circuit interconnects 115 and 116, the transmitter circuits 510 and/or receiver circuits 520 are configured to include respective filters $H_1$ through $H_8$ so that signals conveyed on the interconnects 115 and 116 are no longer classic differential mode communication signals (e.g., balanced and oppositely polarized voltage signals). In certain cases, filters $H_1$ through $H_8$ are deployed in relation to (e.g., near) respective differential mode transmitters 110 and receivers 120 to support non-differential mode communication signals.

In one application as shown in FIG. 5, pairs of interconnects 115 and 116 are disposed on a pre-existing backplane 504 in an electronic system 500. Both a transmitter circuit board 502, or circuit boards 502-1 and 502-2, including transmitter circuits 510 and a receiver circuit board 506, or circuit boards 506-1 and 506-2, including receiver circuits 520 are pluggable into the backplane 504. During operation and when the transmitter circuit board 502, or boards 502-1 and 502-2, and receiver circuit board 506, or boards 506-1 and 506-2, are plugged into the backplane 504, the transmitter circuits 510 support transmission of a non-differential mode communication signal to the respective receiver circuits 520 over the interconnects 115 and 116 of the backplane 504 to support mitigation of cross-talk. Accordingly, techniques of the present invention are well suited for modifying aspects of pluggable circuit boards (e.g., line cards) including corresponding transmitter circuits 510 and receiver circuits 520 instead of replacing or modifying a corresponding backplane 504 and corresponding pre-existing pairs of interconnects 115 and 116 over which the pluggable circuit boards respectively transmit and receive communication signals. Upgrading line cards and, in particular, corresponding transmitter circuit boards 502 and/or receiver circuit boards 506, is minimally invasive compared to overhauling a backplane 504 or otherwise providing complex DSP circuitry to reduce the ill-effects of interference. Thus, higher speed communication may be afforded to a customer merely by replacing old line cards with new line cards, in which the new line cards include circuitry supporting transmission and reception of non-differential mode communication signals through interconnects of the pre-existing backplane 504.

In one embodiment as shown in FIG. 5, the transmitter circuit 510-1 includes one or more filter circuits (e.g., $H_1$ and/or $H_2$) coupled to interconnects 116 to support transmission of the non-differential communication signal. Similarly, the respective receiver circuit 520-1 includes one or more other filters (e.g., $H_3$ and/or $H_4$) coupled to interconnects 116 of the backplane 504 to support transmission of the non-differential communication signal. During operation, the filters $H_1$ through $H_4$ support the conveyance of the non-differential mode communication signals between the transmitter circuit 510-1 and receiver circuit 520-1. Use of certain filter responses $H_1$ through $H_4$ distorts (e.g., change a shape of) an originally transmitted differential mode communication that is conveyed through interconnects 115 and 116 of backplane 504. The non-differential mode communication signals support conveying information on the pair of interconnects 115 and 116 at a higher rate than the originally intended differential mode communication signals.

Note that, in FIG. 5, circuits 510-1 and 510-2 can be disposed on different circuit boards. That is, they don't have to be on a single circuit board 502. The same is true for the receivers. Receiver circuits 520 can be disposed on different circuit boards.

Figure 6:
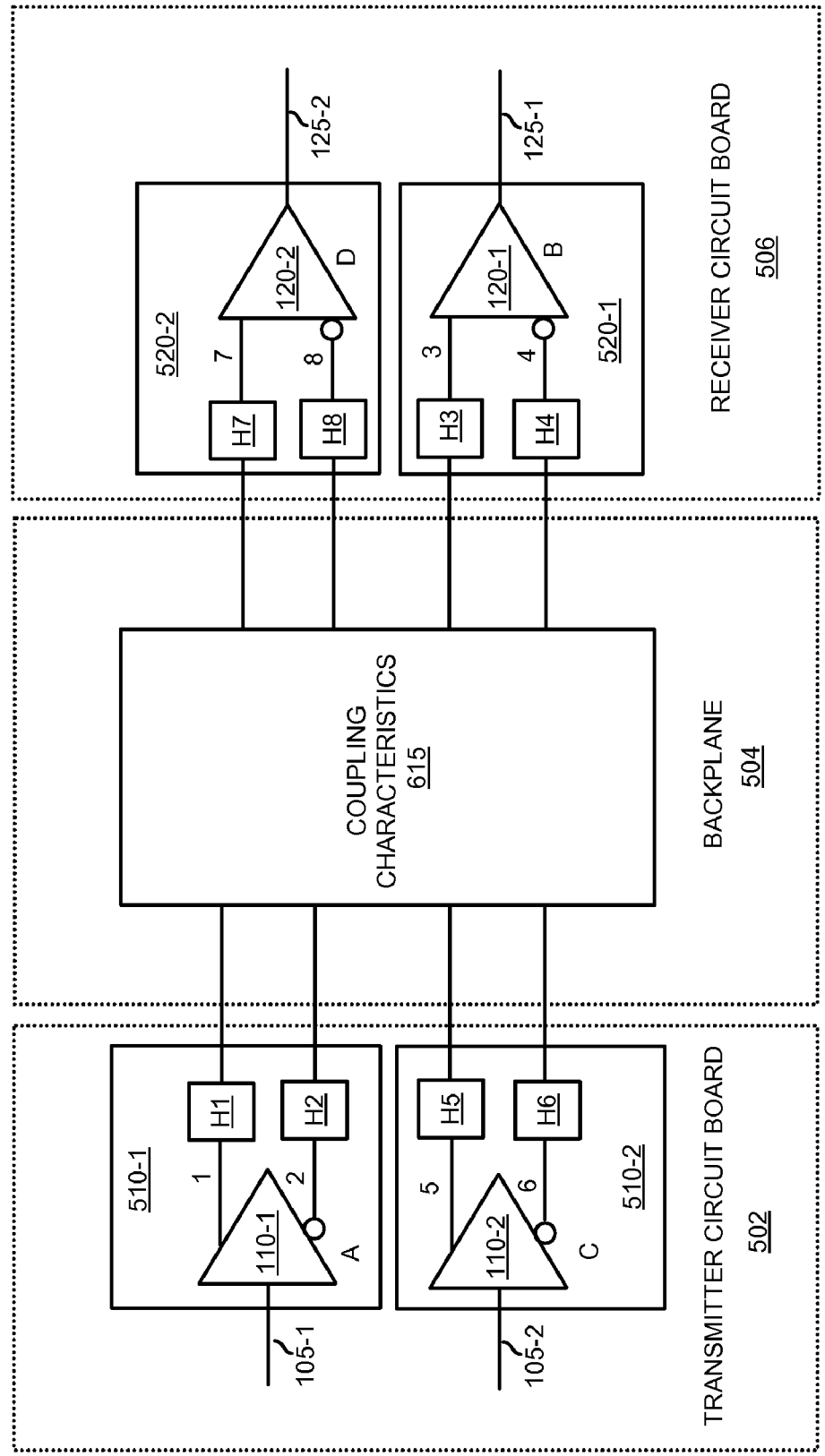
FIG. 6 is a circuit diagram illustrating coupling characteristics of the transmission medium in a general form to highlight the fact that the invention can address a general problem, and also to allow for a general formulation of the invention.

FIG. 6 is a diagram of communication system 500 similar to the embodiment of the invention as shown in FIG. 5. As shown, attributes of interconnects 115 and 116 are quantified as coupling characteristics 615 (e.g., S-Parameter values describing insertion, and return losses, and various couplings such as cross-talk and the coupling between conductors of a pair, e.g., between 115-1 and 115-2, etc.) Although the following equations discuss the effects of coupling between two pairs of conductive paths, they can be expanded to include and thus analyze the cross-talk effects of any number of conductive paths.

In certain layouts of interconnects 115 and 116, there is more cross-talk in certain modes and less in others. As discussed, operating each pair of interconnects 115 and 116 in a mode that minimizes interference provides a simple and effective way of mitigating cross-talk. However, during simulation as will be discussed later in this specification, note that the operational mode at each node is allowed to vary with frequency. Note that the term "mode" standing alone is used in a general sense and includes a single-ended mode, the differential mode, the common mode, and the infinite continuum of modes in between these extremes.

Consider the problem discussed above in FIG. 1. Here, the positive-trace of link CD couples with the positive-trace of link AB, and the negative-trace of link CD couples with the negative-trace of link AB in essentially similar ways. This situation is sometimes observed in legacy back-plane channels. The channel response at receiver's B and D may be written as:

$$X_B(f)=H_B S_{ddBA}(f)H_A X_A(f)+H_B S_{ddBC}(f)H_C X_C(f) \quad \text{(eq. 1)}$$

$$X_D(f)=H_D S_{ddDA}(f)H_A X_A(f)+H_D S_{ddDC}(f)H_C X_C(f) \quad \text{(eq. 2)}$$

Here, $X_A$ is the signal transmitted from node A after a linear filtering operation $H_A$ is applied to it. $S_{ddBA}$ is the channel insertion loss of interconnects 115 from transmitter circuit 510-1 (e.g., transmitter A) to receiver circuit 520-1 (e.g., receiver B) when each is set to differential communication modes. $H_B$ is the pre-detection linear filter at the receiving node B. Other reference symbols are similarly defined.

In equation 1 above, the first term (e.g., $H_B S_{ddBA}(f)H_A X_A(f)$) represents a desired signal, while the second term (e.g., $H_B S_{ddBC}(f)H_C X_C(f)$) represents interference caused by transmitter circuit 510-2. In equation 2, the second term (e.g., $H_D S_{ddDC}(f)H_C X_C(f)$) represents a desired signal, while the first term (e.g., $H_D S_{ddDA}(f)H_A X_A(f)$) represents unwanted interference from transmitter circuit 510-1.

For communication system 500 in FIG. 5, we may characterize the receivers' response as follows (Any negative signs, e.g., those associated with complimentary nodes of differential transceivers are absorbed in filter responses $H_1$, $H_2$, etc.):

$$X_B=H_3\{(S_{31}H_1+S_{32}H_2)X_A+(S_{35}H_5+S_{36}H_6)X_C\}+H_4\{(S_{41}H_1+S_{42}H_2)X_A+(S_{45}H_5+S_{46}H_6)X_C\} \quad \text{(eq.3)}$$

$$X_D=H_7\{(S_{71}H_1+S_{72}H_2)X_A+(S_{75}H_5+S_{76}H_6)X_C\}+H_8\{(S_{81}H_1+S_{82}H_2)X_A+(S_{85}H_5+S_{86}H_6)X_C\} \quad \text{(eq. 4)}$$

As discussed, S-Parameter components represent the channel insertion and return losses and various couplings at the portsinterconnects. The S-values may be measured by applying test signals and thereafter measuring a response. Also, the S-values may be estimated based on a given layout of interconnects 115 and 116 in backplane 504 to produce theoretical insertion and return losses and coupling factors.

Utilizing matrix notation, we can write the above equation in a compact form:

$$\begin{bmatrix} X_B \\ X_D \end{bmatrix} = \begin{bmatrix} H'_B S_{BA} H_A & H'_B S_{BC} H_C \\ H'_D S_{DA} H_A & H'_D S_{DC} H_C \end{bmatrix} \begin{bmatrix} X_A \\ X_C \end{bmatrix} \quad \text{(eq.5)}$$

where $$H_A = \begin{bmatrix} H_1 \\ H_2 \end{bmatrix}, H_B = \begin{bmatrix} H_3 \\ H_4 \end{bmatrix}, H_C = \begin{bmatrix} H_5 \\ H_6 \end{bmatrix}, H_D = \begin{bmatrix} H_7 \\ H_8 \end{bmatrix} \quad \text{(eq.6)}$$

and $$S_{BA} = \begin{bmatrix} S_{31} & S_{32} \\ S_{41} & S_{42} \end{bmatrix}, S_{BC} = \begin{bmatrix} S_{35} & S_{36} \\ S_{45} & S_{46} \end{bmatrix},$$

$$S_{DA} = \begin{bmatrix} S_{71} & S_{72} \\ S_{81} & S_{82} \end{bmatrix}, S_{DC} = \begin{bmatrix} S_{75} & S_{76} \\ S_{85} & S_{86} \end{bmatrix} \quad \text{(eq.7)}$$

The differential-in differential-out communication mode is a special case of the above where, $$H_A = \begin{bmatrix} 1 \\ -1 \end{bmatrix} H_A, H_B = \begin{bmatrix} 1 \\ -1 \end{bmatrix} H_B, H_C = \begin{bmatrix} 1 \\ -1 \end{bmatrix} H_C, H_D = \begin{bmatrix} 1 \\ -1 \end{bmatrix} H_D \quad \text{(eq.8)}$$

(The scalar filter function $H_A$ includes any common filtering applied to nodes 1 & 2; scalar filter functions $H_B$, $H_C$, and $H_D$ are similarly defined.)

Specific Modes and Implementations

If the single-line filters are constrained to be 1, 0, or 1 for all frequencies, the usual single-ended, common, and differential modes arise. The last column indicates whether or not the differential transceiver needs to be modified for a simple implementation of the configuration.

TABLE 1

|    | Transmit Mode      | Receive Mode       | Transceiver component change |
|----|--------------------|--------------------|------------------------------|
| 1  | Differential       | Differential       | None                         |
| 2  | Differential       | Common             | Receiver                     |
| 3  | Common             | Differential       | Transmitter                  |
| 4  | Common             | Common             | Transmitter/Receiver         |
| 5  | Single-ended (P)   | Differential       | None                         |
| 6  | Single-ended (N)   | Differential       | None                         |
| 7  | Single-ended (P)   | Common             | Receiver                     |
| 8  | Single-ended (N)   | Common             | Receiver                     |
| 9  | Differential       | Single-ended (P)   | None                         |
| 10 | Differential       | Single-ended (N)   | None                         |
| 11 | Common             | Single-ended (P)   | Transmitter                  |
| 12 | Common             | Single-ended (N)   | Transmitter                  |
| 13 | Single-ended (P)   | Single-ended (P)   | None                         |
| 14 | Single-ended (N)   | Single-ended (N)   | None                         |
| 15 | Single-ended (P)   | Single-ended (N)   | None                         |
| 16 | Single-ended (N)   | Single-ended (P)   | None                         |
| 17 | Generalized Transmitter and Receiver Modes | | Transmitter/Receiver |

To support a single ended output mode and corresponding single ended input mode as in FIG. 4, the filters may be characterized by filter values:

$$H_A = \begin{bmatrix} 1 \\ 0 \end{bmatrix} H_A, H_B = \begin{bmatrix} 1 \\ 0 \end{bmatrix} H_B, H_C = \begin{bmatrix} 0 \\ -1 \end{bmatrix} H_C, H_D = \begin{bmatrix} 0 \\ -1 \end{bmatrix} H_D \quad (eq.9)$$

To support a common-mode input mode and corresponding single ended output mode as in FIG. 2, the filters may be characterized by filter values:

$$H_A = \begin{bmatrix} 1 \\ 0 \end{bmatrix} H_A, H_B = \begin{bmatrix} 1 \\ 1 \end{bmatrix} H_B, H_C = \begin{bmatrix} 1 \\ -1 \end{bmatrix} H_C, H_D = \begin{bmatrix} 1 \\ -1 \end{bmatrix} H_D \quad (eq.10)$$

Figure 7:
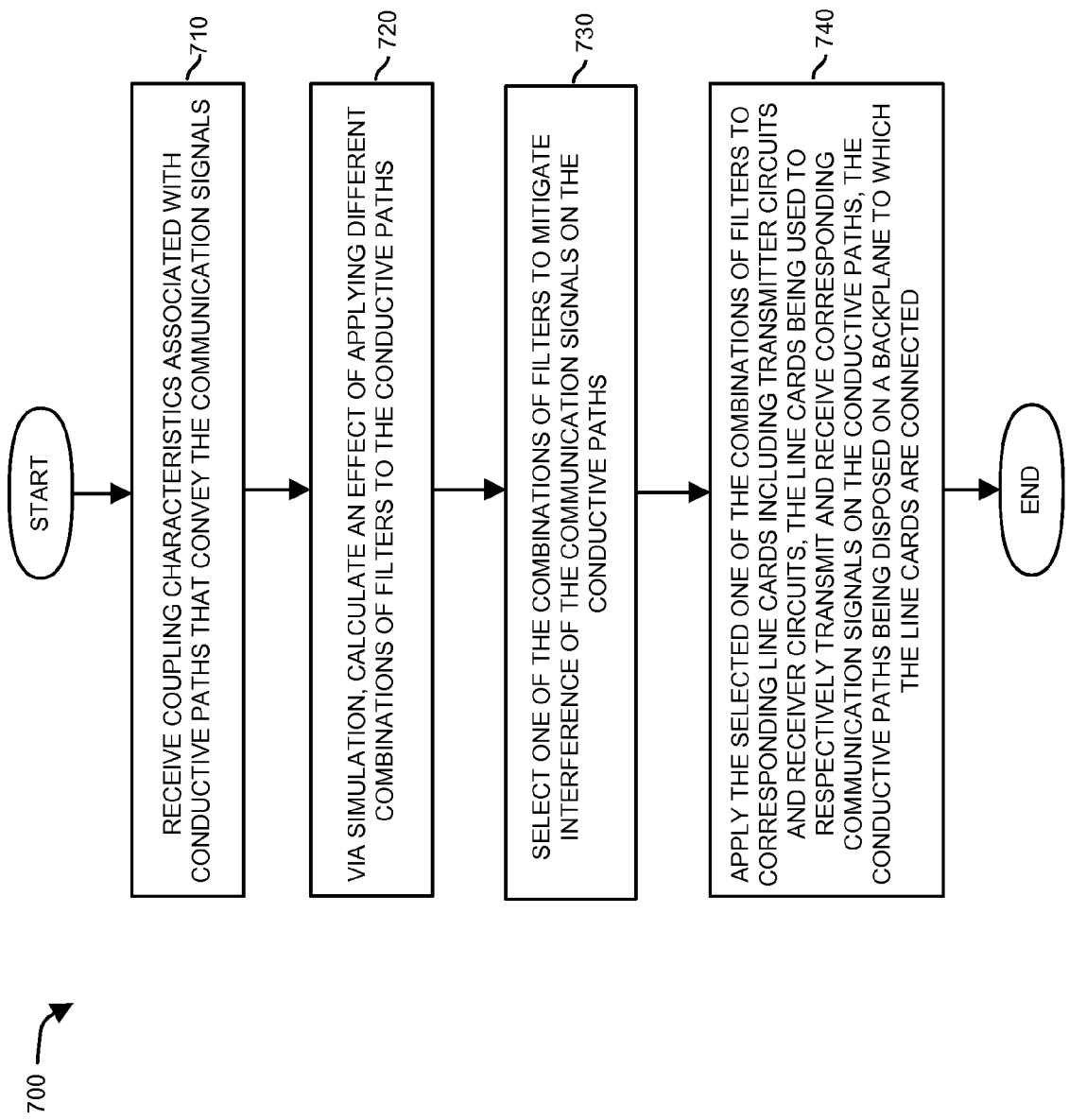
FIG. 7 is a flowchart illustrating a method of identifying preferred filter values for use in the diagram of FIG. 6 to mitigate cross-talk according to an embodiment of the invention.

FIG. 7 is a flowchart 700 illustrating a technique of determining filter values $H_1$ through $H_8$ that may be employed to mitigate cross-talk and increase communications data rates according to an embodiment of the invention. Flowchart 700 is well-suited for being embodied as a software program executed on a personal computer or other suitable device. As discussed, use of the filters in the corresponding transmitter/receiver circuits changes the shape of communication signals conveyed on the interconnects 115 and 116.

In step 710, a computer receives coupling characteristics 615 associated with interconnects 115 and 116 that convey corresponding communication signals. As discussed, coupling characteristics 615 may be determined based on electronic measurements to interconnects 115 and 116 of backplane 504 indicating a degree to which communication signals couple from one set of interconnects 115 to another set of interconnects 116 in a pre-existing circuit board. Also as mentioned, coupling characteristics 615 may be determined by estimating coupling characteristics associated with the interconnects 115 and 116 based on an analysis of a physical layout of interconnects 115 and 116 on a circuit board conveying the communication signals to quantify a degree to which communication signals theoretically couple amongst one another.

In step 720, the computer performs a simulation, calculating an effect of applying different combinations of values of filters $H_1$ through $H_8$ at the transmitter circuits 510 and receiver circuits 520 at either ends of corresponding pairs of interconnects 115 and 116.

In step 730, based on simulation results, the computer or user may then select a preferred combination of filters $H_1$ through $H_8$ to be applied to the transmitter circuits 510 and receiver circuits 520 that respectively transmit and receive corresponding communication signals on the interconnects 115 and 116 through backplane 504. As discussed, use of filters $H_1$ through $H_8$ at respective locations in communication system 500 (in FIG. 6) changes characteristics of the signals conveyed on respective interconnects 115 and 116. For example, use of one more selected filters $H_1$ through $H_8$ at the transmitter circuits 510 and receiver circuits 520 may change voltage waveform characteristics of the corresponding communication signal conveyed over the interconnects so that such signals are no longer classic differential mode communication signals as discussed in FIG. 1, thus reducing interference and enabling higher communication rates.

In step 740, an entity such as a circuit board manufacturer applies the selected one of the combinations of filters $H_1$ through $H_8$ to corresponding transmitter circuit boards 502 and receiver circuit boards 506 (e.g., line cards) including respective transmitter circuits 510 and receiver circuits 520, such circuit boards being used to respectively transmit and receive corresponding communication signals on the interconnects 115 and 116 and reduce interference.

Figure 8:
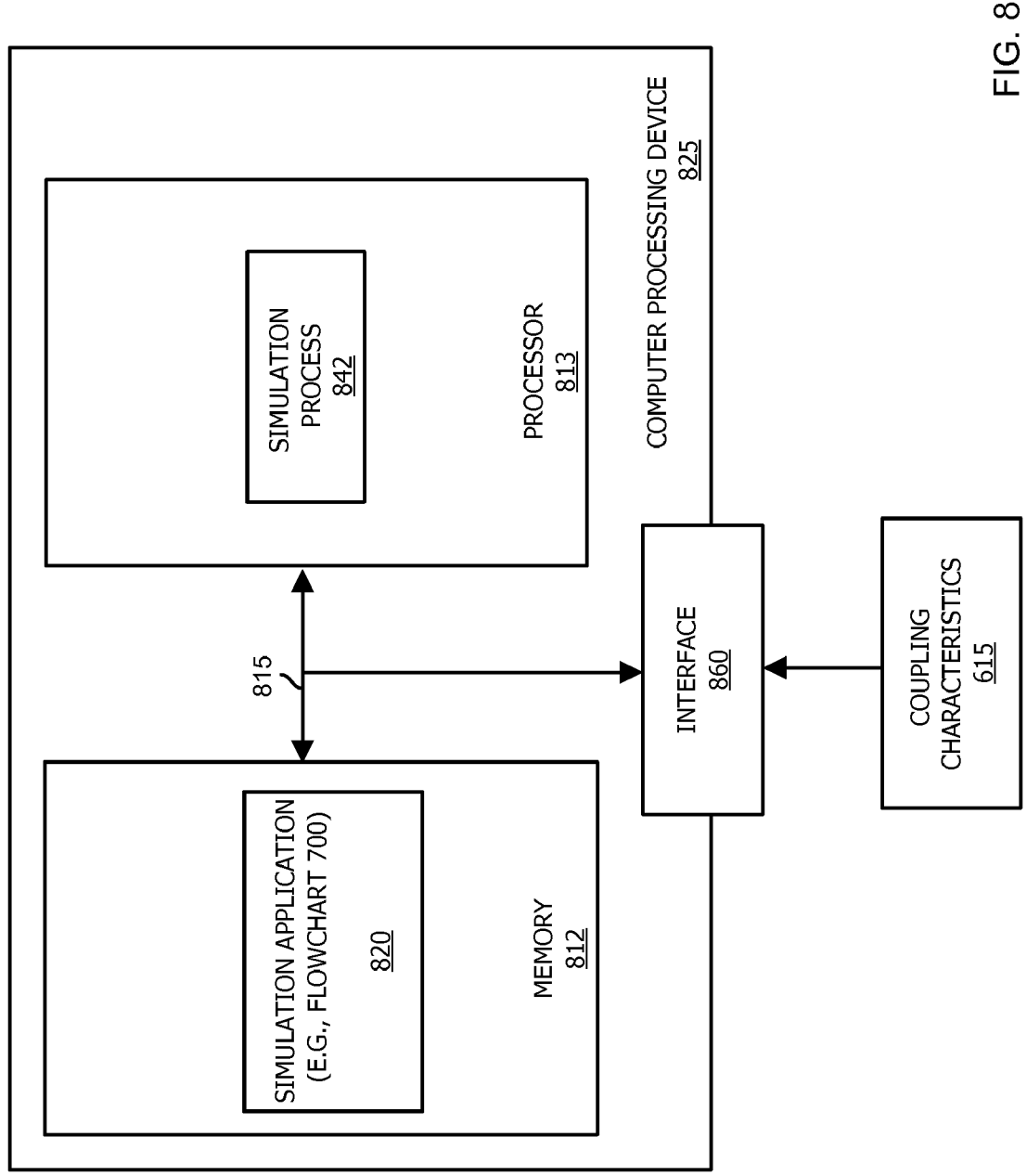
FIG. 8 is a block diagram of a device suitable for executing the flowchart in FIG. 7 according to an embodiment of the invention.

FIG. 8 is a block diagram of a hardware platform suitable for executing flowchart 700 in FIG. 7 (such a computer program application) according to an embodiment of the invention. For example, according to one arrangement, computer processing device 825 such as a personal computer includes interconnect 815 such as a data bus or other circuitry interconnecting memory 812, processor 813, and interface 860. Processor 813 may be any type of central processing unit, microprocessor, processing device, controller of other electronic circuitry capable of accessing simulation application 820 to execute, run, interpret, or otherwise operate simulation application 820 to generate values for filters $H_1$ through $H_8$ according to embodiments of the invention as explained herein. In other words, simulation application 820, may be embodied as one or multiple software programs that enable computer processing device 825 (and similar types of devices) to generate values for filters $H_1$ through $H_8$ to reduce cross talk in communication system 500 and thus enable higher communication rates as discussed.

Memory 812 stores simulation application 820. In general, simulation application 820 in memory 812 represents software code, data and/or logic instructions executed by processor 813. When such code is executed, processor 813 creates simulation process 842 to perform the operations as discussed.

Figure 9:
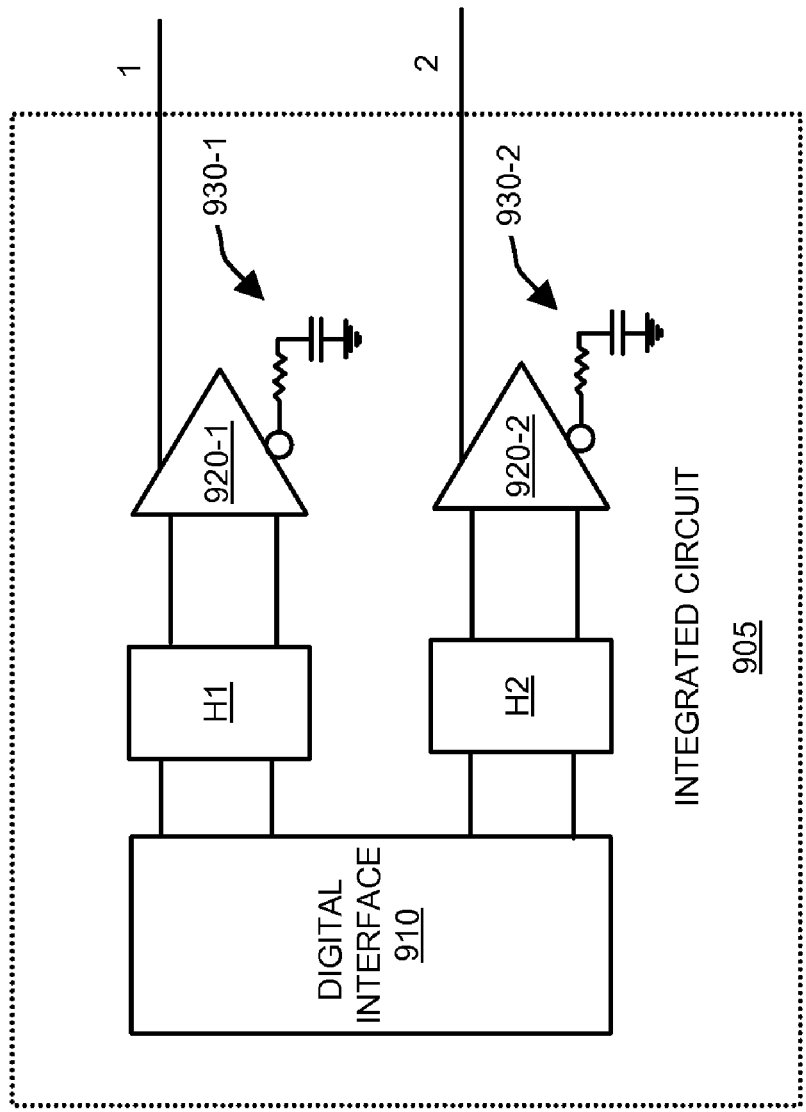
FIG. 9 is a diagram of a transmitter device for mitigating the effects of cross-talk according to an embodiment of the invention.

FIG. 9 is a diagram of an integrated circuit 905 according to an embodiment of the invention. As shown, integrated circuit 905 includes digital interface 910, filters H1 and H2, differential mode transmitter 920-1, differential mode transmitter 920-2, and filters 930-1, 930-2.

According to this embodiment, filters H1 and H2 are implemented in an integrated circuit device (e.g., application specific integrated circuit, field programmable gate array, custom gate array, etc.) based on use of parasitic parameters of transistors in integrated circuit 905. The inverting legs of differential mode transmitters 920 are coupled to ground via respective impedance matching filters 930-1 and 930-2. The non-inverting legs of differential mode transmitters are respectively coupled to nodes 1 and 2 of integrated circuit 905 to drive corresponding circuit traces. During operation, digital interface 910 provides data information to be modulated onto electrical signals produced at nodes 1 and 2 similar to the circuitry as previously discussed. However, the filters $H_1$ and $H_2$ are implemented in silicon. In one embodiment, integrated circuit 905 is selectively configured to transmit i) differential mode communications, ii) common-mode communications, iii) single-ended mode communications and iv) any variations in between, while utilizing existing differential mode transmitter designs.

Because integrated circuit 905 provides similar functionality as discussed, it is well-suited for replacing transmitter circuits 510 previously discussed in relation to FIG. 6. However, according to this embodiment, filters $H_1$ and $H_2$ are implemented in integrated circuit 905 instead of discrete resistors and capacitors. One benefit of this embodiment is reduction in overall required circuit board space because the filter circuits are implemented in an integrated circuit 905. Another benefit is that filters $H_1$ and $H_2$ may be programmed via software to different values without having to change values of resistors and capacitors that would otherwise be fixed to a circuit board.

Figure 10:
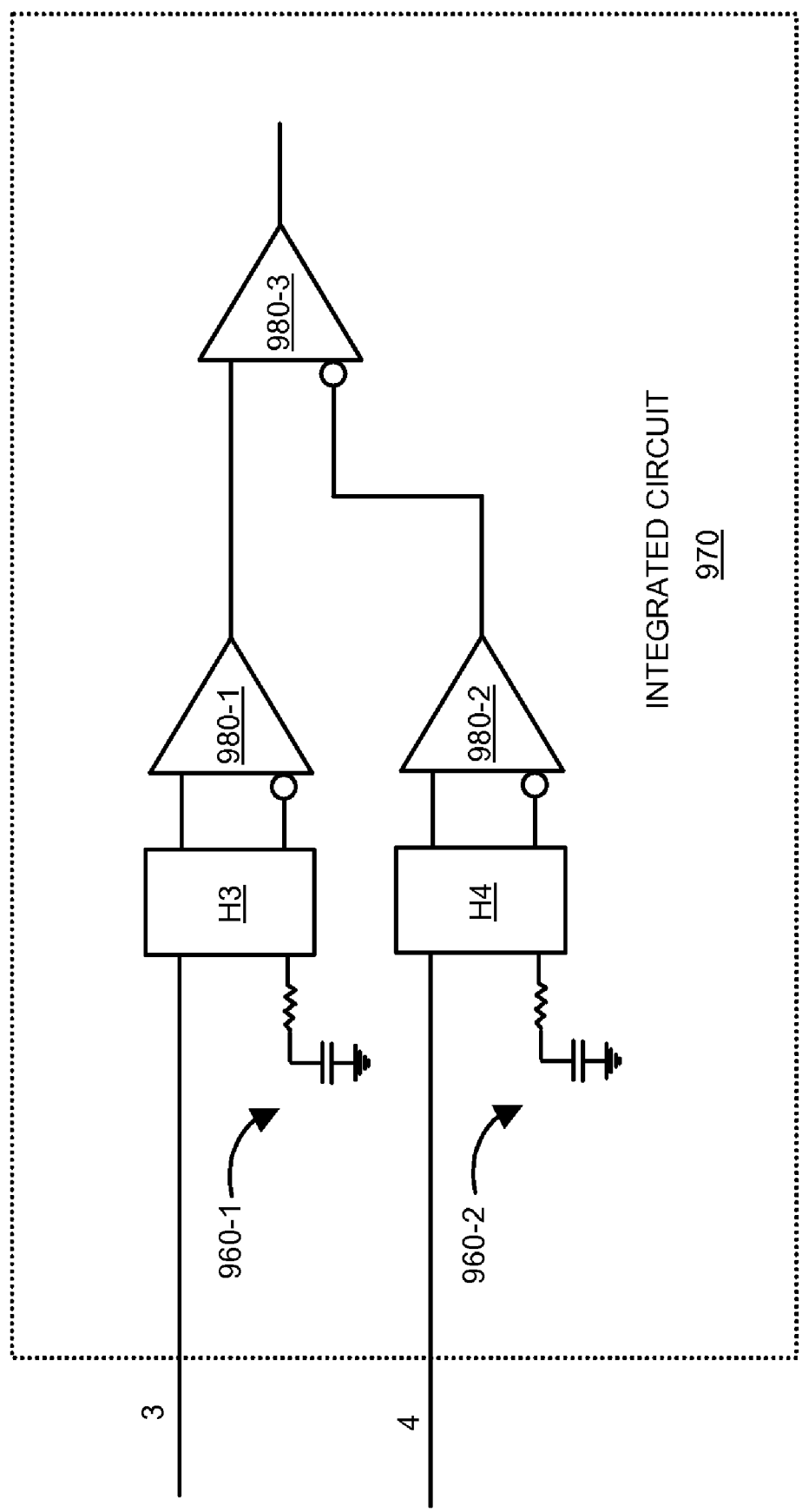
FIG. 10 is a diagram of a receiver device for mitigating the effects of cross-talk according to an embodiment of the invention.

FIG. 10 is a complementary integrated circuit 970 for receiving communication signals according to an embodiment of the invention. As shown, integrated circuit 970 includes impedance matching filters 960-1 and 960-2, filters $H_3$ and $H_4$, and differential mode receivers 980 (e.g., 980-1, 980-2, and 980-3).

According to this embodiment, filters H3 and H4 are implemented in an integrated circuit device (e.g., application specific integrated circuit, field programmable gate array, custom gate array, etc.) based on use of parasitic parameters of transistors in integrated circuit 970. The inverting legs of differential mode receiver 980-1 and 980-2 are coupled to ground through respective filters $H_3$ and $H_4$ and impedance matching filters 960-1 and 960-2. The non-inverting legs of differential mode receiver 980-1 and 980-2 are coupled to nodes 3 and 4 to receive corresponding input signals through filters $H_3$ and $H_4$. In one embodiment, integrated circuit 970 is selectively configured to receive i) differential mode communications, ii) common-mode communications, iii) single-ended mode communications and iv) any variations in between, while utilizing existing differential receiver designs.

Based on this topology, integrated circuit 970 is well-suited for replacing receiver circuits 520 previously discussed in relation to FIG. 6. as discussed, filters $H_3$ and $H_4$ are implemented in integrated circuit 970 instead of discrete resistors and capacitors. One benefit of this embodiment is reduction in overall required circuit board space because the filter circuits $H_3$ and $H_4$ are implemented in integrated circuit 970 instead of discrete resistor and capacitor components. Another benefit is that filters H3 and H4 may be programmed via software to different values without having to change values of resistors and capacitors as discussed in previous embodiments.

In summary, embodiments of the invention may be employed to mitigate the effects of cross-talk in a communication system, thus, enabling such a system to support higher communication rates. Thus, the techniques herein are particularly well-suited for upgrading pre-existing electronic systems and, specifically, electronic circuit boards such as backplanes (e.g., circuit boards providing connectivity between daughter boards or line cards) that are not easily replaced and that require increased communication bandwidth. Instead of backplane replacement, line cards including transmitter and receiver circuits may be modified such that corresponding pairs of interconnects 115 and 116 on the backplane 504 support higher data rate throughput even the such traces were originally designed to support transmission of classic differential mode communication signals (e.g., balanced pairs of signals of opposite polarity).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of mitigating interference among communications signals, the method comprising:
   providing a first pair of interconnects configured to support conveyance of a differential mode communication signal;
   providing electronic circuits that operate to support conveyance of a non-differential mode communication signal on the first pair of conductive paths; and
   conveying the non-differential mode communication signal on the first pair of interconnects to mitigate interference between the non-differential mode communication signal and another communication signal.

2. A method as in claim 1, wherein providing the first pair of interconnects involves providing a backplane upon which the first pair of interconnects are configured as circuit traces to support conveyance of the differential mode communication signal;
   wherein providing the electronic circuits involves providing a transmitter circuit board including a transmitter circuit thereon, the transmitter circuit board coupling to the first pair of interconnects on the backplane to support transmission of the non-differential mode communication signal; and
   wherein providing the electronic circuit involves providing a receiver circuit board including a receiver circuit thereon, the receiver circuit board coupling to the first pair of interconnects on the backplane to support reception of the non-differential mode communication signal.

3. A method as in claim 2, wherein providing the transmitter circuit board includes providing a first filter circuit in communication with at least one of the interconnects of the first pair of conductive paths; and
   wherein providing the receiver circuit board includes providing a second filter circuit in communication with at least one of the interconnects of the first pair of conductive paths.

4. A method of mitigating interference among communication signals, the method comprising:
   providing a first pair of interconnects configured to support conveyance of a first pair of differential mode communication signals in which a corresponding first signal and second signal are balanced and opposite in polarity with respect to each other;
   providing a transmitter circuit to support generation of a second pair of unbalanced communication signals which are substantially different than the first pair of differential mode communication signals; and conveying the second pair of unbalanced communication signals on the first pair of interconnects instead of the first pair of differential mode communication signals to mitigate interference with a second pair of conductive paths.

5. A method as in claim 4 further comprising:
providing a receiver circuit that is coupled to the first pair of interconnects to receive the second pair of unbalanced communication signals, the receiver circuit including a receiver device that is configured to receive common-mode communications instead of differential mode communications.

6. A method as in claim 4, wherein providing the transmitter circuit includes providing a first filter circuit in communication with at least one of the interconnects of the first pair of conductive paths, the method further comprising:
providing a receiver circuit to receive the second pair of unbalanced communications signals, the receiver circuit including a second filter circuit in communication with at least one of the interconnects of the first pair of conductive paths.

7. A method as in claim 4, wherein providing the transmitter circuit involves:
operating the transmitter circuit to support generation of the second pair of unbalanced communication signals, the second pair of unbalanced communication signals including a first signal and a second signal having substantially different voltage magnitudes relative to each other.

8. A method as in claim 4, wherein providing the first pair of interconnects involves providing a backplane upon which the first pair of interconnects are configured as circuit traces to support conveyance of the first pair of differential mode communication signals; and
wherein providing the transmitter circuit involves providing a circuit board including the transmitter circuit thereon, the circuit board coupling to the backplane to support transmission of the second pair of unbalanced communication signals on the first pair of interconnects instead of supporting transmission of the first pair of differential mode communication signals.

9. A method as in claim 8, wherein conveying the second pair of unbalanced communication signals on the first pair of interconnects enables the transmitter circuit to transmit information at a higher rate than when otherwise conveying the information via use of the first pair of differential mode communication signals.

10. A method as in claim 4, wherein conveying the second pair of unbalanced communication signals involves:
generating the first pair of differential mode communication signals at the transmitter circuit;
via at least a portion of the transmitter circuit, reducing a magnitude of an AC (Alternating Current) component of a first signal in the first pair of communication signals to support producing the second pair of unbalanced communication signals.

11. A method as in claim 10, wherein providing the transmitter circuit includes:
providing a filter circuit in communication with at least one of the interconnects of the first pair of conductive paths, the transmitter circuit supporting generation of the second pair of unbalanced communication signals that would otherwise be balanced communication signals without the filter circuit.

12. A method as in claim 11, wherein providing the transmitter circuit includes:
configuring the filter circuit to include discrete electronic components that are electrically coupled to one of the interconnects of the first pair of conductive paths.

13. A method as in claim 4, wherein providing the transmitter circuit includes:
providing a filter circuit that is electrically coupled to at least one of the interconnects of the first pair of interconnects to support producing the second pair of unbalanced communication signals that would otherwise be balanced differential mode communication signals without the filter circuit.

14. A method as in claim 4, providing the transmitter circuit includes:
replacing a differential mode driver, that if otherwise used would transmit the first pair of differential mode communication signals, with a common-mode driver to produce the second pair of unbalanced communication signals including a first signal and second signal that are substantially similar to each other.

15. A method as in claim 4, wherein providing a transmitter circuit includes providing a software programmable transmitter device including at least one filter that is selectively configured to support one of:
i) differential mode communications,
ii) common-mode communications, and
iii) single-ended mode communications.

16. A method as in claim 4, wherein conveying the second pair of unbalanced communication signals involves transmitting first and second signals, similar in both magnitude and polarity, on each conductor of the first pair of interconnects instead of the first pair of differential mode communication signals to support common mode communications.

17. A method as in claim 4, wherein conveying the second pair of unbalanced communication signals involves:
generating the first pair of differential mode communication signals;
via a filter in the transmitter circuit, substantially eliminating a magnitude of an AC (Alternating Current) component of a first signal in the first pair of differential mode communication signals to produce the second pair of unbalanced communication signals that support single-ended mode communications instead of differential mode communications.

18. A method as in claim 4 wherein the second pair of unbalanced communications signals includes (i) a first communications signal having a first magnitude and (ii) a second communications signal having a second magnitude which is different than the first magnitude; and
wherein conveying the second pair of unbalanced communications signals includes outputting, from the transmitter circuit, the first and second communications signals on the first pair of interconnects.

19. A method as in claim 4 wherein the second pair of unbalanced communications signals includes a first communications signal and a second communications signal, the first and second communications signals having a same polarity; and
wherein conveying the second pair of unbalanced communications signals includes outputting, from the transmitter circuit, the first and second communications signals on the first pair of interconnects.

20. An electronic system configured to mitigate interference among communications signals, the electronic system comprising:
a first pair of interconnects that are configured to support conveyance of a first differential mode communication signal, the first differential communication signal comprising a balanced first signal and corresponding second signal of opposite polarities;

a transmitter circuit coupled to the first pair of interconnects to support generation of a second mode communication signal that is different than the first differential mode communication signal;

a receiver circuit coupled to the first pair of interconnects to receive the second mode communication signal; and wherein the first pair of interconnects convey the second mode communication signal instead of the first differential mode communication signal to mitigate interference with a second pair of interconnects on the circuit board that convey another communication signal.

21. An electronic system as in claim 20, wherein the first pair of interconnects are disposed on a backplane, the electronic system further comprising:

a transmitter circuit board including the transmitter circuit thereon, the transmitter circuit board connected to the backplane;

a receiver circuit board including the receiver circuit thereon, the receiver circuit board connected to the backplane; and wherein the transmitter circuit transmits the second mode communication signal to the receiver circuit over the first pair of interconnects of the backplane.

22. An electronic system as in claim 21, wherein the transmitter circuit includes a first filter circuit in communication with at least one of the interconnects of the first pair of interconnects in the backplane; and wherein the receiver circuit includes a second filter circuit in communication with at least one of the interconnects of the first pair of interconnects on the backplane.

23. An electronic system as in claim 21, wherein both the transmitter circuit and receiver circuit each include filters comprising discrete electronic components, the filters at least partially causing a differential mode communication signals transmitted by the transmitter circuit to be conveyed as second mode communication signals on the interconnects of the backplane.

24. An electronic system as in claim 20, wherein the first pair of interconnects form part of a data bus that conveys bit information from the transmitter circuit to the receiver circuit.

25. An electronic system as in claim 20, wherein the second mode communication signals is a pair of unbalanced communication signals including a first signal and a second signal having substantially different voltage magnitudes relative to each other.

26. An electronic system as in claim 20, wherein the second mode communication signals support conveying information on the first pair of interconnects at a higher rate than the differential mode communication signals.

27. An electronic system as in claim 20, wherein the transmitter circuit and the receiver circuit each include respective software programmable transmitter and receiver devices that are selectively configurable to support one of:
  i) differential mode communications,
  ii) common-mode communications, and
  iii) single-ended mode communications.

28. An electronic system as in claim 20 wherein the transmitter circuit, when supporting the generation of the second mode communication signal, is arranged to output a first transmitter signal having a first magnitude and a second transmitter signal having a second magnitude on the first pair of interconnects, the first and second magnitudes being different.

29. An electronic system as in claim 20 wherein the transmitter circuit, when supporting the generation of the second mode communication signal, is arranged to output a first transmitter signal and a second transmitter signal on the first pair of interconnects, the first and second transmitter signals having a same polarity.

30. An electronic system configured to mitigate interference among communications signals, the electronic system comprising:

a first pair of interconnects configured to support conveyance of a first pair of differential mode communication signals;

means for supporting generation of a second pair of non-differential mode communication signals which are substantially different than the first pair of differential mode communication signals; and the first pair of interconnects conveying the second pair of non-differential mode communication signals instead of the first pair of differential mode communication signals to mitigate interference with a second pair of conductive paths.

* * * * *